United States Patent [19]
Uchida

[11] Patent Number: 6,088,065
[45] Date of Patent: Jul. 11, 2000

[54] CONTOUR CORRECTION APPARATUS AND METHOD

[75] Inventor: Tomoaki Uchida, Noda, Japan

[73] Assignee: Victor Company of Japan, Ltd., Yokohama, Japan

[21] Appl. No.: 09/128,931

[22] Filed: Aug. 5, 1998

[30] Foreign Application Priority Data

Sep. 3, 1997 [JP] Japan ................................ 9-254275

[51] Int. Cl.[7] .................................................. H04N 5/21
[52] U.S. Cl. .......................................... 348/625; 382/266
[58] Field of Search .................................. 348/606, 607, 348/618, 619, 625, 627, 628, 252, 253, 241, 246; 382/263, 266, 272; H04N 5/21

[56] References Cited

U.S. PATENT DOCUMENTS

| | | | |
|---|---|---|---|
| 5,293,541 | 3/1994 | Ito ............................................ | 348/625 |
| 5,467,145 | 11/1995 | Limberg .................................. | 348/628 |
| 5,469,225 | 11/1995 | Hong ....................................... | 348/625 |
| 5,668,606 | 9/1997 | Okamoto et al. ....................... | 348/625 |
| 5,695,126 | 12/1997 | Hong ....................................... | 348/625 |
| 5,912,702 | 6/1999 | Sudo ....................................... | 348/234 |
| 5,959,693 | 9/1999 | Wu et al. ................................. | 348/624 |

FOREIGN PATENT DOCUMENTS 5-292522  11/1993  Japan .

*Primary Examiner*—Victor R. Kostak
*Attorney, Agent, or Firm*—Louis Woo

[57] ABSTRACT

In a contour correction apparatus, a first sample is selected from among at least five plural samples of an input digital video signal as an indication of an upper limit value. The plural samples correspond to neighboring pixels respectively. The first sample has a value greater than a center value among values of the plural samples. A second sample is selected from among at least the five plural samples as an indication of a lower limit value. The second sample has a value smaller than the center value among the values of the plural samples. High-frequency signal components are generated with respect to a center sample among the plural samples. The high-frequency signal components are added to the center sample among the plural samples to generate an addition-resultant signal. A value of the addition-resultant signal is limited to within a range between the upper limit value and the lower limit value.

8 Claims, 12 Drawing Sheets

VALUE OF
SIGNAL B27

VALUE OF
SIGNAL B28

VALUE OF
SIGNAL B29

TIME

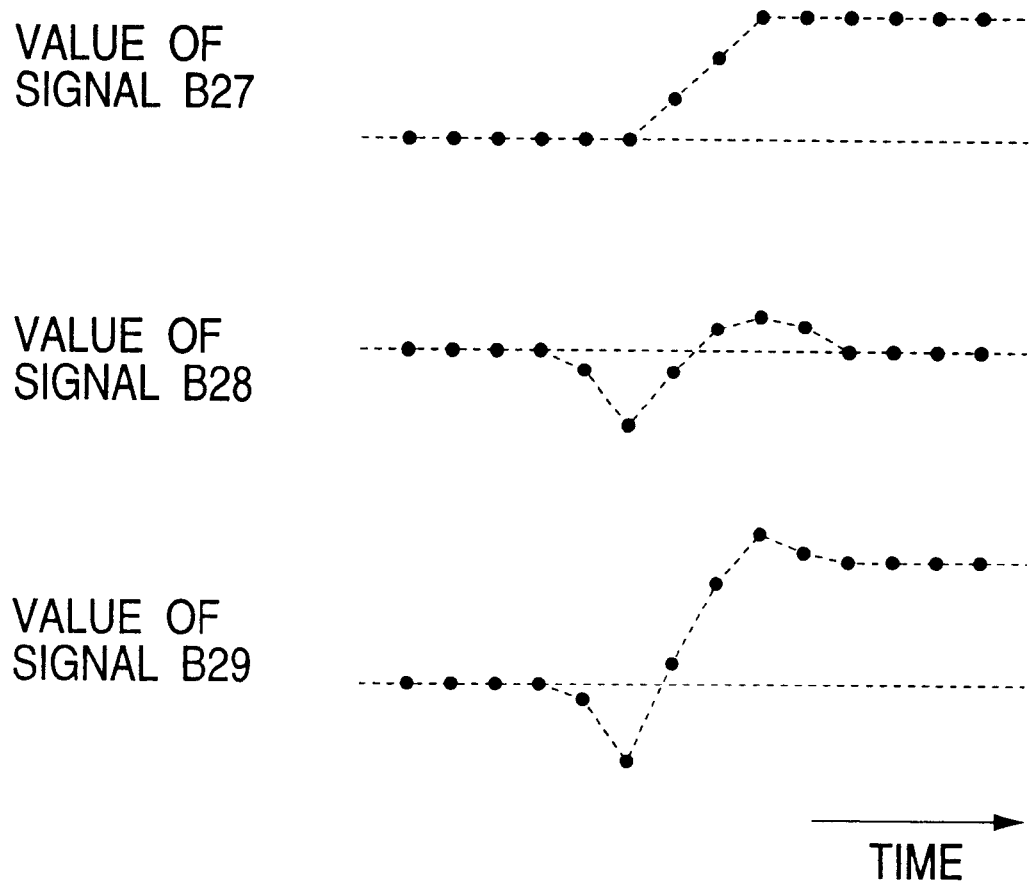

CONTOUR CORRECTION APPARATUS AND METHOD

BACKGROUND OF THE INVENTION

1. Field of the Invention

This invention generally relates to a contour correction apparatus. This invention particularly relates to an apparatus for correcting a video signal to sharpen contours in a picture represented by the video signal. This invention also relates to a method of contour correction.

2. Description of the Related Art

Contour correction apparatuses of various types have been proposed which sharpen contours or edges in pictures represented by video signals. Here, the contours or the edges in the pictures mean the boundaries among different-hue or different-luminance zones in the pictures. A typical contour correction apparatus adds overshoot and preshoot (undershoot) signal components to contour-corresponding or edge-corresponding segments of a video signal.

Japanese published unexamined patent application 5-292522 discloses a color picture quality improving circuit provided with a section for sharpening contours in a picture represented by a video signal.

In the color picture quality improving circuit of Japanese application 5-292522, an input signal "a" including a color-difference signal is deferred by a first delay circuit into a first delayed signal "b". The first delayed signal "b" is deferred by a second delay circuit into a second delayed signal "c". A first maximum level output circuit compares the levels of the signals "a", "b", and "c", and selects one signal from among them which has the maximum level. The maximum-level signal "d" selected by the first maximum level output circuit is fed to a shoot waveform removing circuit. A first minimum level output circuit compares the levels of the signals "a", "b", and "c", and selects one signal from among them which has the minimum level. The minimum-level signal "e" selected by the first minimum level output circuit is fed to the shoot waveform removing circuit.

In the color picture quality improving circuit of Japanese application 5-292522, a first adder combines the input signal "a" and the second delayed signal "c". An attenuator halves the level of the output signal of the first adder, generating the attenuated signal "f". A first inverter acts on the first delayed signal "b". A second adder combines the attenuated signal "f" and the output signal of the first inverter into an addition-resultant signal "g". A second inverter converts the addition-resultant signal "g" into a first contour corrective signal "h". A variable-gain amplifier converts the first contour corrective signal "h" into a second contour corrective signal. A third adder combines the first delayed signal "b" and the second contour corrective signal (the output signal of the variable-gain amplifier) into an addition-resultant signal "i" having suitable preshoot and overshoot components. The third adder outputs the addition-resultant signal "i" to the shoot waveform removing circuit.

In the color picture quality improving circuit of Japanese application 5-292522, the shoot waveform removing circuit includes a second maximum level output circuit and a second minimum level output circuit. The second maximum level output circuit compares the levels of the signals "e" and "i", and selects one signal from among them which has the greater level (the maximum level). The greater-level signal "j" selected by the second maximum level output circuit has a waveform free from lower-side shoot portions (undershoot portions). The greater-level signal "j" is fed to the second minimum level output circuit. The second minimum level output circuit compares the levels of the signals "d" and "j", and selects one signal from among them which has the smaller level (the minimum level). The smaller-level signal "k" selected by the second minimum level output circuit has a waveform free from upper-side shoot portions (overshoot portions). The smaller-level signal "k" is outputted as a correction-resultant signal (a correction-resultant color-difference signal).

The color picture quality improving circuit of Japanese application 5-292522 is unsuited to the processing of a digital video signal.

SUMMARY OF THE INVENTION

It is a first object of this invention to provide an improved contour correction apparatus.

It is a second object of this invention to provide an improved method of contour correction.

A first aspect of this invention provides a contour correction apparatus comprising first means for selecting a first sample from among at least five plural samples of an input digital video signal as an indication of an upper limit value, the plural samples corresponding to neighboring pixels respectively, the first sample having a value greater than a center value among values of the plural samples; second means for selecting a second sample from among at least the five plural samples as an indication of a lower limit value, the second sample having a value smaller than the center value among the values of the plural samples; third means for generating high-frequency signal components with respect to a center sample among the plural samples; fourth means for adding the high-frequency signal components generated by the third means to the center sample among the plural samples to generate an addition-resultant signal; and fifth means for limiting a value of the addition-resultant signal generated by the fourth means to within a range between the upper limit value and the lower limit value provided by the first and second means.

A second aspect of this invention is based on the first aspect thereof, and provides a contour correction apparatus wherein the value of the first sample is equal to a greatest value among the values of the plural samples, and the value of the second sample is equal to a smallest value among the values of the plural samples.

A third aspect of this invention is based on the first aspect thereof, and provides a contour correction apparatus wherein the value of the first sample is different from a greatest value among the values of the plural samples, and the value of the second sample is different from a smallest value among the values of the plural samples.

A fourth aspect of this invention is based on the first aspect thereof, and provides a contour correction apparatus further comprising sixth means for adding high-frequency signal components to an output signal of the fifth means to additionally generate undershoot-corresponding signal components and overshoot-corresponding signal components in the output signal of the fifth means.

A fifth aspect of this invention is based on the first aspect thereof, and provides a contour correction apparatus further comprising sixth means for increasing the upper limit value above its normal level and decreasing the lower limit value below its normal level to additionally generate undershoot-corresponding signal components and overshoot-corresponding signal components in an output signal of the fifth means.

A sixth aspect of this invention is based on the fourth aspect thereof, and provides a contour correction apparatus further comprising seventh means for making the undershoot-corresponding signal components and the overshoot-corresponding signal components asymmetrical with each other in time-domain amplitude form.

A seventh aspect of this invention is based on the fifth aspect thereof, and provides a contour correction apparatus further comprising seventh means for making the undershoot-corresponding signal components and the overshoot-corresponding signal components asymmetrical with each other in time-domain amplitude form.

An eighth aspect of this invention provides a method of contour correction which comprises the steps of selecting a first sample from among at least five plural samples of an input digital video signal as an indication of an upper limit value, the plural samples corresponding to neighboring pixels respectively, the first sample having a value greater than a center value among values of the plural samples; selecting a second sample from among at least the five plural samples as an indication of a lower limit value, the second sample having a value smaller than the center value among the values of the plural samples; generating high-frequency signal components with respect to a center sample among the plural samples; adding the high-frequency signal components to the center sample among the plural samples to generate an addition-resultant signal; and limiting a value of the addition-resultant signal to within a range between the upper limit value and the lower limit value.

BRIEF DESCRIPTION OF THE DRAWINGS

FIG. 12 is a time-domain diagram of the values represented by samples of various signals in a contour correction apparatus according to an eighth embodiment of this invention.

DESCRIPTION OF THE PREFERRED EMBODIMENTS

First Embodiment

A baseband video signal of a first general type is composed of three primary color signals, that is, a red signal, a green signal, and a blue signal. In the case of such a video signal, contour correction apparatuses are provided for the red signal, the green signal, and the blue signal, respectively. The contour correction apparatuses have structures similar to each other.

A baseband video signal of a second general type is composed of a luminance signal and two color-difference signals (two chrominance signals). In the case of such a video signal, contour correction apparatuses are provided for the luminance signal and the two color-difference signals, respectively. The contour correction apparatuses have structures similar to each other.

Figure 1:
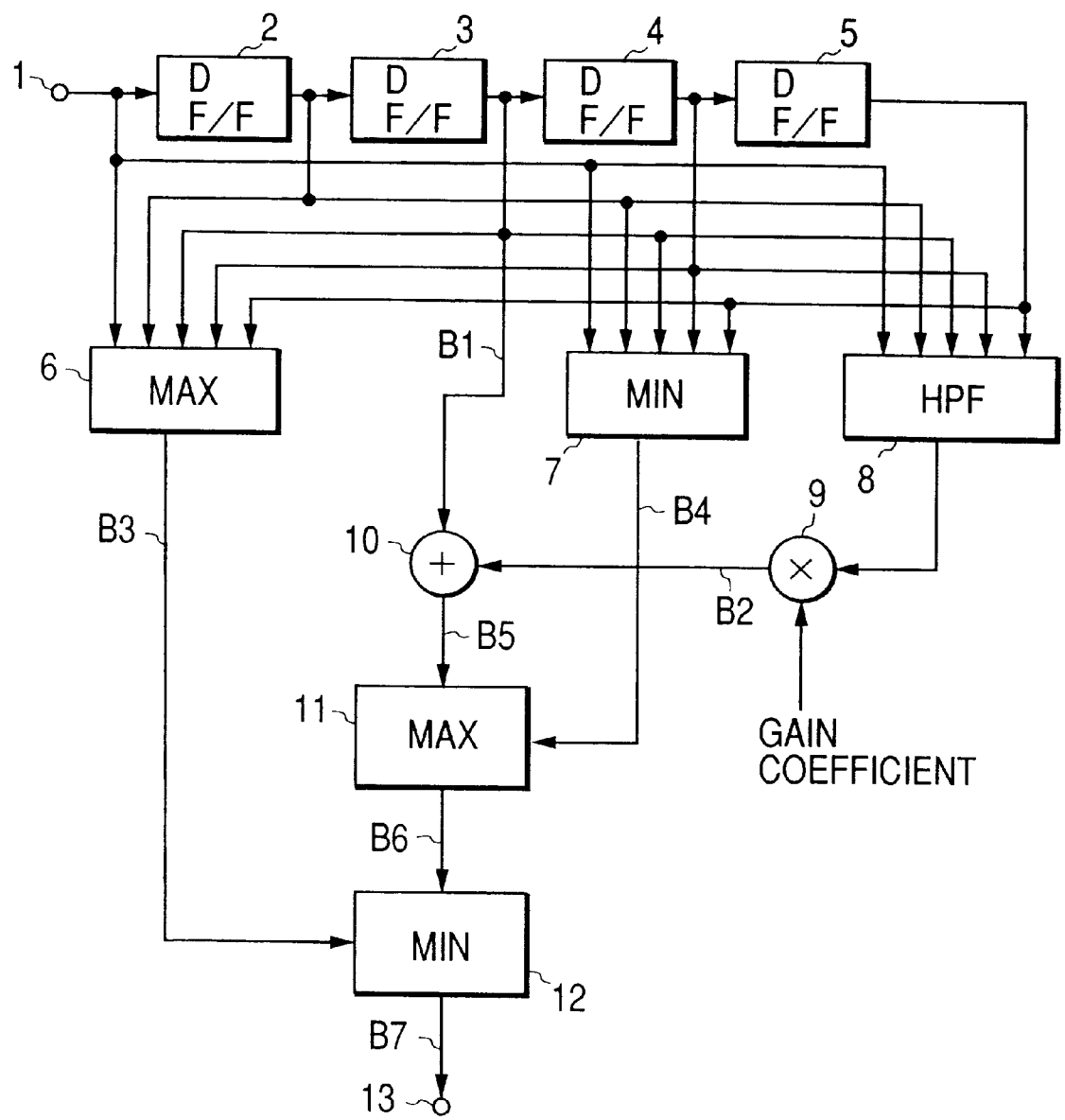
FIG. 1 is a block diagram of a contour correction apparatus according to a first embodiment of this invention.

FIG. 1 shows a contour correction apparatus according to a first embodiment of this invention. The contour correction apparatus of FIG. 1 includes an apparatus input terminal 1 subjected to an input digital video signal which is the digital version of one of a red signal, a green signal, a blue signal, a luminance signal, and color-difference signals. The contour correction apparatus of FIG. 1 also includes an apparatus output terminal 13.

The contour correction apparatus of FIG. 1 further includes D flip-flops 2, 3, 4, and 5, a maximum value detection circuit 6, a minimum value detection circuit 7, a high pass filter 8, a multiplier 9, an adder 10, a maximum value detection circuit 11, and a minimum value detection circuit 12.

The D flip-flops 2, 3, 4, and 5 serve as 1-sample clock delay elements, respectively. The D flip-flops 2, 3, 4, and 5 are connected in series or cascade. The input terminal of the D flip-flop 2 is connected to the apparatus input terminal 1. The output terminal of the D flip-flop 2 is connected to the input terminal of the D flip-flop 3. The output terminal of the D flip-flop 3 is connected to the input terminal of the D flip-flop 4. The output terminal of the D flip-flop 4 is connected to the input terminal of the D flip-flop 5.

The maximum value detection circuit 6 is connected to the apparatus input terminal 1. The maximum value detection circuit 6 is also connected to the output terminals of the D flip-flops 2, 3, 4, and 5. The maximum value detection circuit 6 is connected to the minimum value detection circuit 12.

The minimum value detection circuit 7 is connected to the apparatus input terminal 1. The minimum value detection circuit 7 is also connected to the output terminals of the D flip-flops 2, 3, 4, and 5. The minimum value detection circuit 7 is connected to the maximum value detection circuit 11.

The high pass filter 8 is connected to the apparatus input terminal 1. The high pass filter 8 is also connected to the output terminals of the D flip-flops 2, 3, 4, and 5. The high pass filter 8 is connected to a first input terminal of the multiplier 9. A second input terminal of the multiplier 9 is subjected to a control signal representing a variable gain coefficient.

The output terminal of the multiplier 9 is connected to a first input terminal of the adder 10. A second input terminal of the adder 10 is connected to the output terminal of the D flip-flop 3. The output terminal of the adder 10 is connected to the maximum value detection circuit 11. The maximum value detection circuit 11 is connected to the minimum value detection circuit 12. The minimum value detection circuit 12 is connected to the apparatus output terminal 13.

The D flip-flops 2, 3, 4, and 5 receive a clock pulse signal from a suitable device (not shown). The clock pulse signal has a given frequency and a given period corresponding to one signal sample. Each of the D flip-flops 2, 3, 4, and 5 provides a signal delay in response to the clock pulse signal.

The provided signal delay corresponds to the period of the clock pulse signal. Thus, the provided signal delay corresponds to one signal sample. The input digital video signal applied to the apparatus input terminal 1 has a stream of digital signal samples temporally spaced at equal intervals corresponding to the period of the clock pulse signal. The samples of the input digital video signal correspond to pixels, respectively. The input digital video signal is fed via the apparatus input terminal 1 to the D flip-flop 2, the maximum value detection circuit 6, the minimum value detection circuit 7, and the high pass filter 8.

The D flip-flop 2 delays the input digital video signal by a time corresponding to the period between adjacent clock pulses, that is, the 1-sample interval. The D flip-flop 2 outputs the delayed signal to the D flip-flop 3, the maximum value detection circuit 6, the minimum value detection circuit 7, and the high pass filter 8.

The D flip-flop 3 delays the output signal of the D flip-flop 2 by a time corresponding to the period between adjacent clock pulses, that is, the 1-sample interval. The D flip-flop 3 outputs the delayed signal B1 to the D flip-flop 4, the maximum value detection circuit 6, the minimum value detection circuit 7, the high pass filter 8, and the adder 10.

The D flip-flop 4 delays the output signal B1 of the D flip-flop 3 by a time corresponding to the period between adjacent clock pulses, that is, the 1-sample interval. The D flip-flop 4 outputs the delayed signal to the D flip-flop 5, the maximum value detection circuit 6, the minimum value detection circuit 7, and the high pass filter 8.

The D flip-flop 5 delays the output signal of the D flip-flop 4 by a time corresponding to the period between adjacent clock pulses, that is, the 1-sample interval. The D flip-flop 5 outputs the delayed signal to the maximum value detection circuit 6, the minimum value detection circuit 7, and the high pass filter 8.

The input digital video signal and the output signals of the D flip-flops 2, 3, 4, and 5 correspond to five successive pixels. The output signal B1 of the D flip-flop 3 is defined as corresponding to a pixel of interest which agrees with a center pixel among the five successive pixels.

The maximum value detection circuit 6 compares the values (the levels) represented by the input digital video signal and the output signals of the D flip-flops 2, 3, 4, and 5, and detects and selects one signal from among them which has the maximum value. In other words, the maximum value detection circuit 6 detects a pixel having the maximum level among the five successive pixels. The maximum value, that is, the value of the signal selected by the maximum value detection circuit 6 will be used as an upper limit value by the minimum value detection circuit 12. The maximum-value signal B3 selected by the maximum value detection circuit 6 is fed to the minimum value detection circuit 12.

The minimum value detection circuit 7 compares the values (the levels) represented by the input digital video signal and the output signals of the D flip-flops 2, 3, 4, and 5, and detects and selects one signal from among them which has the minimum value. In other words, the minimum value detection circuit 7 detects a pixel having the minimum level among the five successive pixels. The minimum value, that is, the value of the signal selected by the minimum value detection circuit 7 will be used as a lower limit value by the maximum value detection circuit 11. The minimum-value signal B4 selected by the minimum value detection circuit 7 is fed to the maximum value detection circuit 11.

The high pass filter 8 processes the input digital video signal and the output signals of the D flip-flops 2, 3, 4, and 5 into a signal corresponding to high-frequency components of the output signal B1 of the D flip-flop 3. For example, the high pass filter 8 includes a 5-tap filter having tap gains of $-\frac{1}{4}$, $-1$, $\frac{5}{2}$, $-1$, and $-\frac{1}{4}$ which are assigned to the input digital video signal and the output signals of the D flip-flops 2, 3, 4, and 5 respectively. The high pass filter 8 outputs the high-frequency-corresponding signal to the multiplier 9.

The device 9 multiplies the value of the output signal of the high pass filter 8 by the gain coefficient represented by the control signal. Thus, the multiplier 9 converts the output signal of the high pass filter 8 into a multiplication-resultant signal B2. The multiplier 9 outputs the multiplication-resultant signal B2 to the adder 10. The adder 10 combines the output signal B1 of the D flip-flop 3 and the output signal B2 of the multiplier 9 into an addition-resultant signal B5. The operation of the adder 10 agrees with a process of adding the high-frequency components to the output signal B1 of the D flip-flop 3 to sharpen contours or edges in a picture represented by the input digital video signal. Here, the contours and the edges in the picture mean the boundaries among different-hue or different-luminance zones in the picture. The adder 10 outputs the addition-resultant signal B5 to the maximum value detection circuit 11.

The maximum value detection circuit 11 compares the values (the levels) represented by the output signals B4 and B5 of the minimum value detection circuit 7 and the adder 10, and detects and selects one signal from among them which has the greater value (the maximum value). The greater-value signal B6 selected by the maximum value detection circuit 11 is fed to the minimum value detection circuit 12. The greater-value signal B6 represents a waveform from which undershoot portions are removed.

The minimum value detection circuit 12 compares the values (the levels) represented by the output signals B3 and B6 of the maximum value detection circuits 6 and 11, and detects and selects one signal from among them which has the smaller value (the minimum value). The smaller-value signal B7 selected by the minimum value detection circuit 12 is applied to the apparatus output terminal 13. The smaller-value signal B7 represents a waveform from which overshoot portions are removed. The smaller-value signal B7 is fed via the apparatus output terminal 13 to an external device (not shown) as a correction-resultant video signal.

Figure 2:
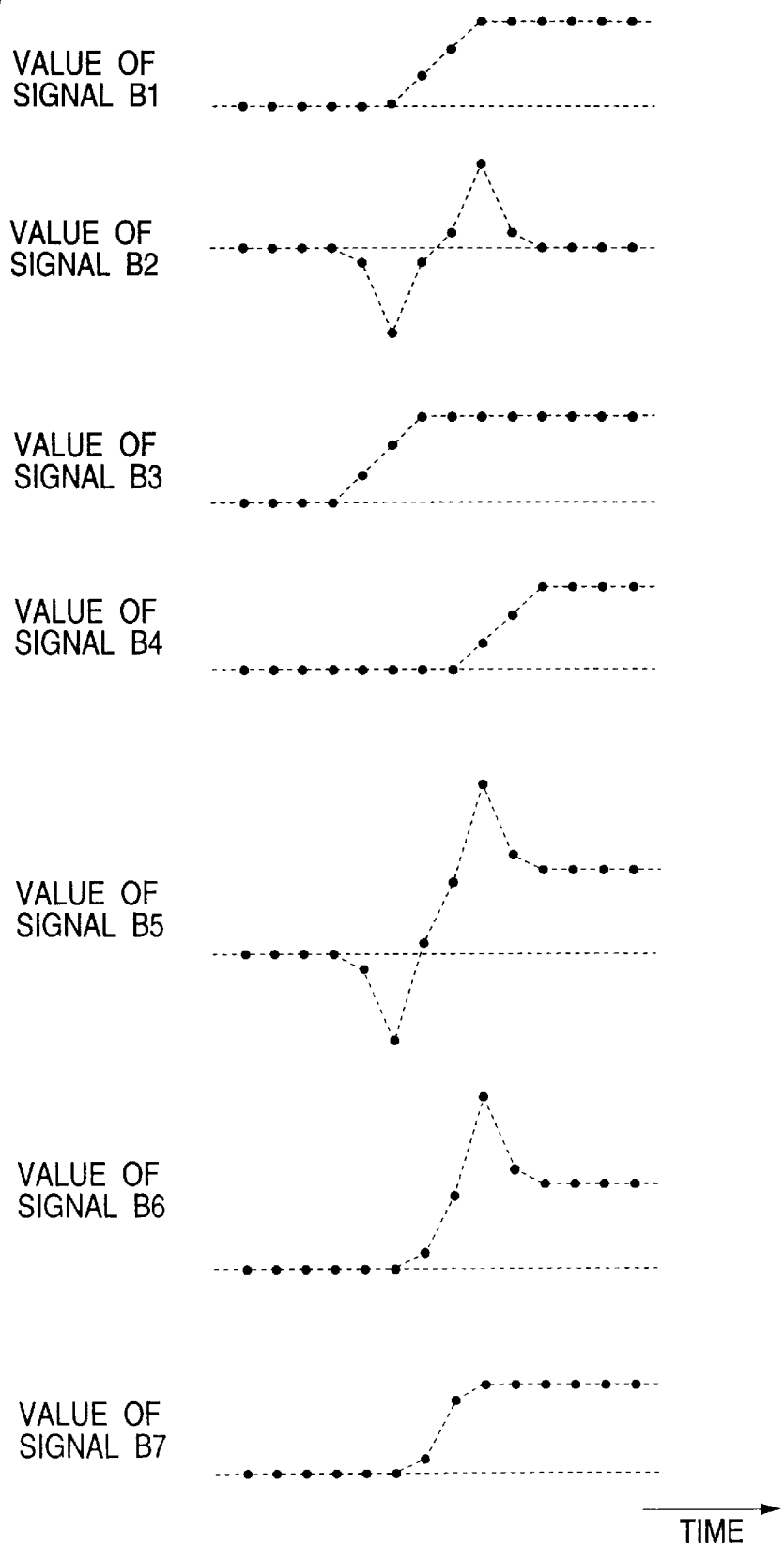
FIG. 2 is a time-domain diagram of the values represented by samples of various signals in the contour correction apparatus of FIG. 1.

Variations in the values represented by the signals B1, B2, B3, B4, B5, B6, and B7 will be explained with reference to FIG. 2. It is assumed that the value represented by a sample of the output signal B1 of the D flip-flop 3 increases at a constant rate during a 3-sample time interval as shown in FIG. 2. The increase in the value of the signal B1 corresponds to a contour or an edge in a picture. The value represented by the output signal B2 of the multiplier 9 varies along a time-domain form corresponding to a differential of the time-domain form of the value represented by the signal B1.

The value represented by the output signal B3 of the maximum value detection circuit 6 increases at a constant rate equal to the rate of the increase in the value of the signal B1. The value represented by the output signal B4 of the minimum value detection circuit 7 increases at a constant rate equal to the rate of the increase in the value of the signal B1.

The value represented by the output signal B5 of the adder 10 varies along a time-domain form corresponding to the combination of the time-domain form of the value represented by the signal B1 and the time-domain form of the value represented by the signal B2. The time-domain form of the value of the signal B5 has an undershoot portion and an overshoot portion immediately preceding and following an increasing portion respectively.

The value represented by the output signal B6 of the maximum value detection circuit 11 varies along a time-domain form which is similar to the time-domain waveform of the value of the signal B5 except that the undershoot portion is absent. The time-domain form of the value of the signal B6 has the overshoot portion immediately following the increasing portion.

The value represented by the output signal B7 of the minimum value detection circuit 12 varies along a time-domain form which is similar to the time-domain waveform of the value of the signal B6 except that the overshoot portion is absent. The value of the signal B7 increases at a rate higher than the rate of the increase in the value of the signal B1. The rate of the increase in the value of the signal B7 depends on the gain coefficient represented by the control signal fed to the multiplier 9. Specifically, the rate of the increase in the value of the signal B7 rises as the gain coefficient increases. When the gain coefficient is equal to "2", the rate of the increase in the value of the signal B7 is approximately equal to twice the rate of the increase in the value of the signal B1.

As understood from the above explanation, the maximum value detection circuit 11 and the minimum value detection circuit 12 serve as a device for limiting the value of the signal B5 to within the range between the maximum value (the upper limit value) and the minimum value (the lower limit value). As made clear from the comparison between the signals B1 and B7, the contour correction apparatus of FIG. 1 sharpens every contour in a picture represented by the input digital video signal to a degree depending on the gain coefficient represented by the control signal fed to the multiplier 9. The degree of the sharpening can be adjusted by changing the gain coefficient.

The contour correction apparatus of FIG. 1 may be modified into a structure which operates on six or more successive pixels. In this case, six or more 1-sample delay elements are provided, and the maximum value detection circuit 6, the minimum value detection circuit 7, and the high pass filter 8 are modified to operate on the six or more successive pixels.

Second Embodiment

Figure 3:
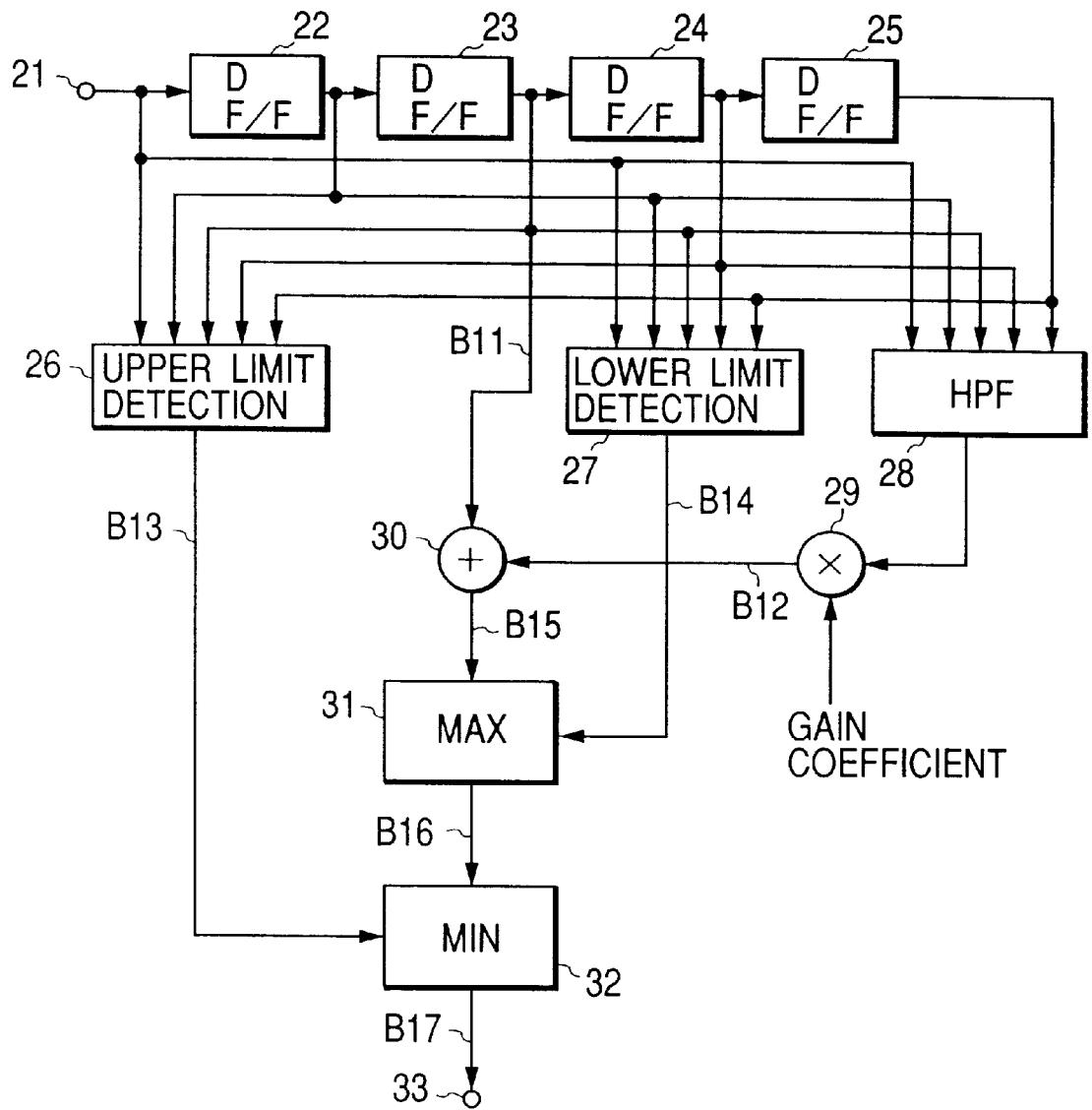
FIG. 3 is a block diagram of a contour correction apparatus according to a second embodiment of this invention.

FIG. 3 shows a contour correction apparatus according to a second embodiment of this invention. The contour correction apparatus of FIG. 3 includes an apparatus input terminal 21 subjected to an input digital video signal which is the digital version of one of a red signal, a green signal, a blue signal, a luminance signal, and color-difference signals. The contour correction apparatus of FIG. 3 also includes an apparatus output terminal 33.

The contour correction apparatus of FIG. 3 further includes D flip-flops 22, 23, 24, and 25, an upper limit detection circuit 26, a lower limit detection circuit 27, a high pass filter 28, a multiplier 29, an adder 30, a maximum value detection circuit 31, and a minimum value detection circuit 32.

The D flip-flops 22, 23, 24, and 25 serve as 1-sample delay elements, respectively. The D flip-flops 22, 23, 24, and 25 are connected in series or cascade. The input terminal of the D flip-flop 22 is connected to the apparatus input terminal 21. The output terminal of the D flip-flop 22 is connected to the input terminal of the D flip-flop 23. The output terminal of the D flip-flop 23 is connected to the input terminal of the D flip-flop 24. The output terminal of the D flip-flop 24 is connected to the input terminal of the D flip-flop 25.

The upper limit detection circuit 26 is connected to the apparatus input terminal 21. The upper limit detection circuit 26 is also connected to the output terminals of the D flip-flops 22, 23, 24, and 25. The upper limit detection circuit 26 is connected to the minimum value detection circuit 32.

The lower limit detection circuit 27 is connected to the apparatus input terminal 21. The lower limit detection circuit 27 is also connected to the output terminals of the D flip-flops 22, 23, 24, and 25. The lower limit detection circuit 27 is connected to the maximum value detection circuit 31.

The high pass filter 28 is connected to the apparatus input terminal 21. The high pass filter 28 is also connected to the output terminals of the D flip-flops 22, 23, 24, and 25. The high pass filter 28 is connected to a first input terminal of the multiplier 29. A second input terminal of the multiplier 29 is subjected to a control signal representing a variable gain coefficient.

The output terminal of the multiplier 29 is connected to a first input terminal of the adder 30. A second input terminal of the adder 30 is connected to the output terminal of the D flip-flop 23. The output terminal of the adder 30 is connected to the maximum value detection circuit 31. The maximum value detection circuit 31 is connected to the minimum value detection circuit 32. The minimum value detection circuit 32 is connected to the apparatus output terminal 33.

The D flip-flops 22, 23, 24, and 25 receive a clock pulse signal from a suitable device (not shown). The clock pulse signal has a given frequency and a given period corresponding to one signal sample. Each of the D flip-flops 22, 23, 24, and 25 provides a signal delay in response to the clock pulse signal. The provided signal delay corresponds to the period of the clock pulse signal. Thus, the provided signal delay corresponds to one signal sample. The input digital video signal applied to the apparatus input terminal 21 has a stream of digital signal samples temporally spaced at equal intervals corresponding to the period of the clock pulse signal. The samples of the input digital video signal correspond to pixels, respectively. The input digital video signal is fed via the apparatus input terminal 21 to the D flip-flop 22, the upper limit detection circuit 26, the lower limit detection circuit 27, and the high pass filter 28.

The D flip-flop 22 delays the input digital video signal by a time corresponding to the period between adjacent clock pulses, that is, the 1-sample interval. The D flip-flop 22 outputs the delayed signal to the D flip-flop 23, the upper limit detection circuit 26, the lower limit detection circuit 27, and the high pass filter 28.

The D flip-flop 23 delays the output signal of the D flip-flop 22 by a time corresponding to the period between adjacent clock pulses, that is, the 1-sample interval. The D flip-flop 23 outputs the delayed signal B11 to the D flip-flop 24, the upper limit detection circuit 26, the lower limit detection circuit 27, the high pass filter 28, and the adder 30.

The D flip-flop 24 delays the output signal B11 of the D flip-flop 23 by a time corresponding to the period between adjacent clock pulses, that is, the 1-sample interval. The D flip-flop 24 outputs the delayed signal to the D flip-flop 25, the upper limit detection circuit 26, the lower limit detection circuit 27, and the high pass filter 28.

The D flip-flop 25 delays the output signal of the D flip-flop 24 by a time corresponding to the period between adjacent clock pulses, that is, the 1-sample interval. The D flip-flop 25 outputs the delayed signal to the upper limit detection circuit 26, the lower limit detection circuit 27, and the high pass filter 28.

The input digital video signal and the output signals of the D flip-flops 22, 23, 24, and 25 correspond to five successive pixels. The output signal B11 of the D flip-flop 23 is defined as corresponding to a pixel of interest which agrees with a center pixel among the five successive pixels.

The upper limit detection circuit 26 compares the values (the levels) represented by the input digital video signal and the output signals of the D flip-flops 22, 23, 24, and 25, and detects and selects one signal from among them which has the second greatest value. In other words, the upper limit detection circuit 26 detects a pixel having the second greatest level among the five successive pixels. The second greatest value, that is, the value of the signal selected by the upper limit detection circuit 26 will be used as an upper limit value by the minimum value detection circuit 32. The upper-limit signal B13 selected by the upper limit detection circuit 26 is fed to the minimum value detection circuit 32.

The lower limit detection circuit 27 compares the values (the levels) represented by the input digital video signal and the output signals of the D flip-flops 22, 23, 24, and 25, and detects and selects one signal from among them which has the second smallest value. In other words, the lower limit detection circuit 27 detects a pixel having the second smallest level among the five successive pixels. The second smallest value, that is, the value of the signal selected by the lower limit detection circuit 27 will be used as a lower limit value by the maximum value detection circuit 31. The lower-limit signal B14 selected by the lower limit detection circuit 27 is fed to the maximum value detection circuit 31.

The high pass filter 28 processes the input digital video signal and the output signals of the D flip-flops 22, 23, 24, and 25 into a signal corresponding to high-frequency components of the output signal B11 of the D flip-flop 23. For example, the high pass filter 28 includes a 5-tap filter having tap gains of $-\frac{1}{4}$, $-1$, $\frac{5}{2}$, $-1$, and $-\frac{1}{4}$ which are assigned to the input digital video signal and the output signals of the D flip-flops 22, 23, 24, and 25 respectively. The high pass filter 28 outputs the high-frequency-corresponding signal to the multiplier 29.

The device 29 multiplies the value of the output signal of the high pass filter 28 by the gain coefficient represented by the control signal. Thus, the multiplier 29 converts the output signal of the high pass filter 28 into a multiplication-resultant signal B12. The multiplier 29 outputs the multiplication-resultant signal B12 to the adder 30. The adder 30 combines the output signal B11 of the D flip-flop 23 and the output signal B12 of the multiplier 29 into an addition-resultant signal B15. The operation of the adder 30 agrees with a process of adding the high-frequency components to the output signal B11 of the D flip-flop 23 to sharpen contours or edges in a picture represented by the input digital video signal. Here, the contours and the edges in the picture mean the boundaries among different-hue or different-luminance zones in the picture. The adder 30 outputs the addition-resultant signal B15 to the maximum value detection circuit 31.

The maximum value detection circuit 31 compares the values (the levels) represented by the output signals B14 and B15 of the lower limit detection circuit 27 and the adder 30, and detects and selects one signal from among them which has the greater value (the maximum value). The greater-value signal B16 selected by the maximum value detection circuit 31 is fed to the minimum value detection circuit 32. The greater-value signal B16 represents a waveform from which undershoot portions are removed.

The minimum value detection circuit 32 compares the values (the levels) represented by the output signals B13 and B16 of the upper limit detection circuit 26 and the maximum value detection circuit 31, and detects and selects one signal from among them which has the smaller value (the minimum value). The smaller-value signal B17 selected by the minimum value detection circuit 32 is applied to the apparatus output terminal 33. The smaller-value signal B17 represents a waveform from which overshoot portions are removed. The smaller-value signal B17 is fed via the apparatus output terminal 33 to an external device (not shown) as a correction-resultant video signal.

Figure 4:
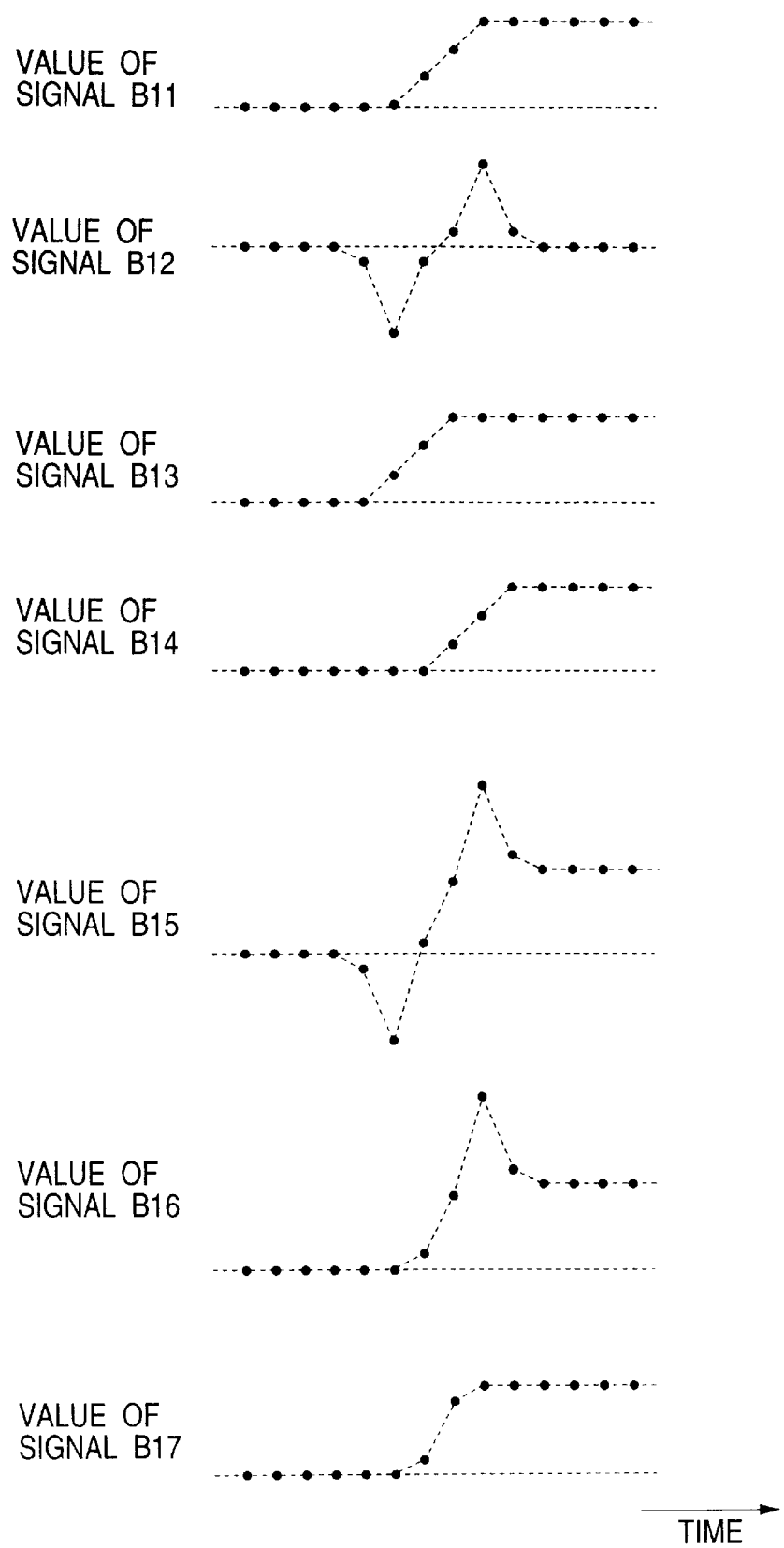
FIG. 4 is a time-domain diagram of a first example of the values represented by samples of various signals in the contour correction apparatus of FIG. 3.

Variations in the values represented by the signals B11, B12, B13, B14, B15, B16, and B17 will be explained with reference to FIG. 4. It is assumed that the value represented by a sample of the output signal B11 of the D flip-flop 23 increases at a constant rate during a 3-sample time interval as shown in FIG. 4. The increase in the value of the signal B11 corresponds to a contour or an edge in a picture. The value represented by the output signal B12 of the multiplier 29 varies along a time-domain form corresponding to a differential of the time-domain form of the value represented by the signal B11.

The value represented by the output signal B13 of the upper limit detection circuit 26 increases at a constant rate equal to the rate of the increase in the value of the signal B11. The value represented by the output signal B14 of the lower limit detection circuit 27 increases at a constant rate equal to the rate of the increase in the value of the signal B11.

The value represented by the output signal B15 of the adder 30 varies along a time-domain form corresponding to the combination of the time-domain form of the value represented by the signal B11 and the time-domain form of the value represented by the signal B12. The time-domain form of the value of the signal B15 has an undershoot portion and an overshoot portion immediately preceding and following an increasing portion respectively.

The value represented by the output signal B16 of the maximum value detection circuit 31 varies along a time-domain form which is similar to the time-domain waveform of the value of the signal B15 except that the undershoot portion is absent. The time-domain form of the value of the signal B16 has the overshoot portion immediately following the increasing portion.

The value represented by the output signal B17 of the minimum value detection circuit 32 varies along a time-domain form which is similar to the time-domain waveform of the value of the signal B16 except that the overshoot portion is absent. The value of the signal B17 increases at a rate higher than the rate of the increase in the value of the signal B11. The higher increasing rate means sharpening the contour or the edge in the picture. The rate of the increase in the value of the signal B17 depends on the gain coefficient represented by the control signal fed to the multiplier 29. Specifically, the rate of the increase in the value of the signal B17 rises as the gain coefficient increases. When the gain coefficient is equal to "2", the rate of the increase in the value of the signal B17 is approximately equal to twice the rate of the increase in the value of the signal B11.

As understood from the above explanation, the maximum value detection circuit 31 and the minimum value detection circuit 32 serve as a device for limiting the value of the signal B15 to within the range between the maximum value (the upper limit value) and the minimum value (the lower limit value). As made clear from the comparison between the time-domain forms of the signals B11 and B17 in FIG. 4, the contour correction apparatus of FIG. 3 sharpens every contour in a picture represented by the input digital video signal to a degree depending on the gain coefficient given by the control signal fed to the multiplier 9. The degree of the sharpening can be adjusted by changing the gain coefficient.

The contour correction apparatus of FIG. 3 may be modified into a structure which operates on six or more successive pixels. In this case, six or more 1-sample delay elements are provided, and the upper limit detection circuit 26, the lower limit detection circuit 27, and the high pass filter 28 are modified to operate on the six or more successive pixels.

Figure 5:
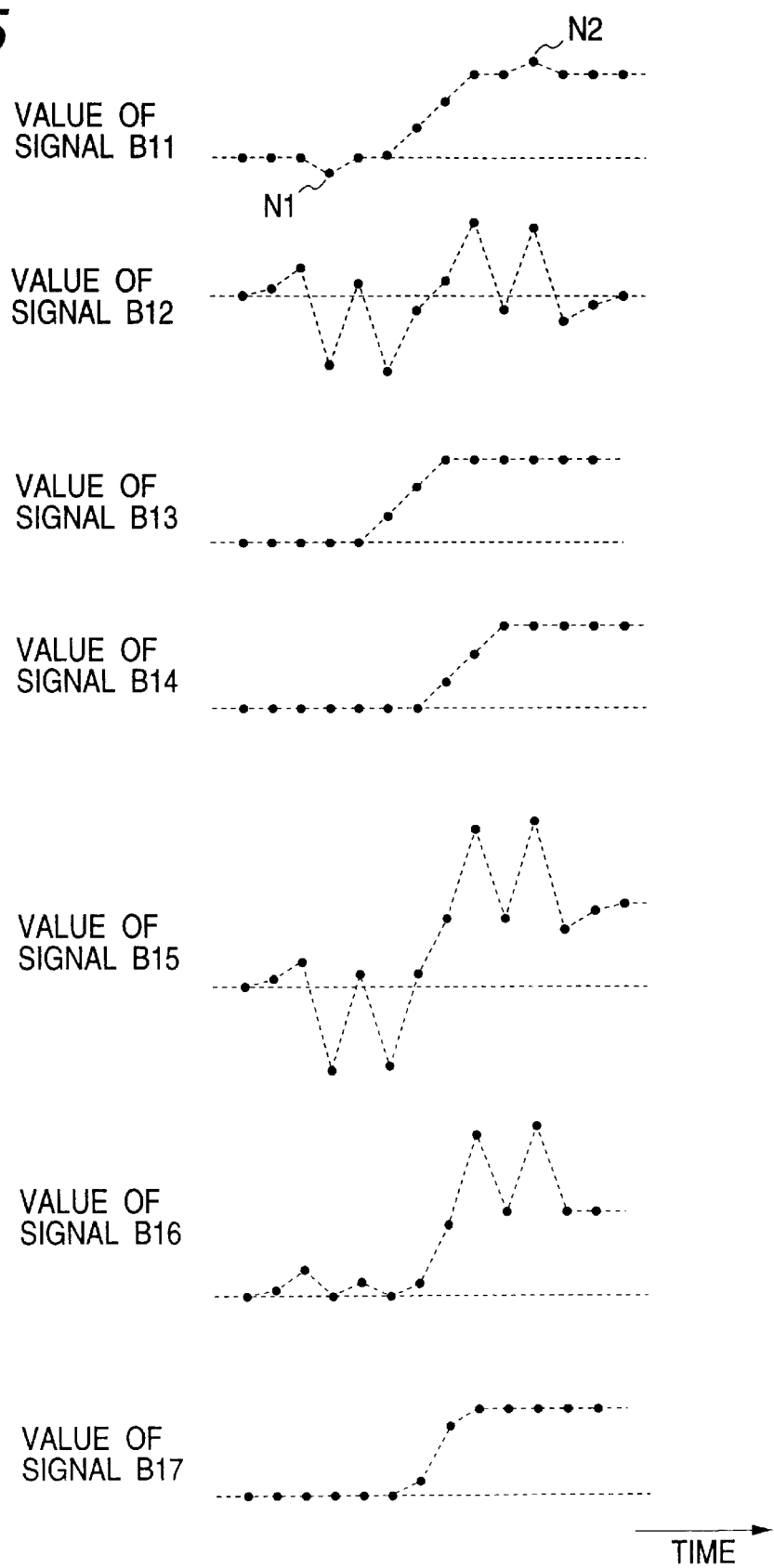
FIG. 5 is a time-domain diagram of a second example of the values represented by samples of various signals in the contour correction apparatus of FIG. 3.

Variations in the values represented by the signals B11, B12, B13, B14, B15, B16, and B17 will be further explained with reference to FIG. 5. It is assumed that the value represented by a sample of the output signal B11 of the D flip-flop 23 increases at a constant rate during a 3-sample time interval, and that the value slightly dips due to noise N1 before the start of the increase and the value slightly peaks due to noise N2 after the end of the increase as shown in FIG. 5. The increase in the value of the signal B11 corresponds to a contour or an edge in a picture. The value represented by the output signal B12 of the multiplier 29 varies along a time-domain form corresponding to a differential of the time-domain form of the value represented by the signal B11. The time-domain form of the value of the signal B12 has noise components.

The value represented by the output signal B13 of the upper limit detection circuit 26 increases at a constant rate equal to the rate of the increase in the value of the signal B11. The value represented by the output signal B14 of the lower limit detection circuit 27 increases at a constant rate equal to the rate of the increase in the value of the signal B11. As shown in FIG. 5, the output signals B13 and B14 of the upper limit detection circuit 26 and the lower limit detection circuit 27 are free from components related to the noise N1 and the noise N2.

The value represented by the output signal B15 of the adder 30 varies along a time-domain form corresponding to the combination of the time-domain form of the value represented by the signal B11 and the time-domain form of the value represented by the signal B12. The time-domain form of the value of the signal B15 has an undershoot portion and an overshoot portion immediately preceding and following an increasing portion respectively. In addition, the time-domain form of the value of the signal B15 has noise components.

The value represented by the output signal B16 of the maximum value detection circuit 31 varies along a time-domain form which is similar to the time-domain waveform of the value of the signal B15 except that the undershoot portion is absent. The time-domain form of the value of the signal B16 has the overshoot portion immediately following the increasing portion. In addition, the time-domain form of the value of the signal B16 has noise components.

The value represented by the output signal B17 of the minimum value detection circuit 32 varies along a time-domain form which is similar to the time-domain waveform of the value of the signal B16 except that the overshoot portion is absent and the noise components are absent. The value of the signal B17 increases at a rate higher than the rate of the increase in the value of the signal B11. The higher increasing rate means sharpening the contour or the edge in the picture. The rate of the increase in the value of the signal B17 depends on the gain coefficient represented by the control signal fed to the multiplier 29. Specifically, the rate of the increase in the value of the signal B17 rises as the gain coefficient increases. When the gain coefficient is equal to "2", the rate of the increase in the value of the signal B17 is approximately equal to twice the rate of the increase in the value of the signal B11.

As understood from the above explanation, the contour correction apparatus of FIG. 3 removes noise components from the input digital video signal.

Third Embodiment

Figure 6:
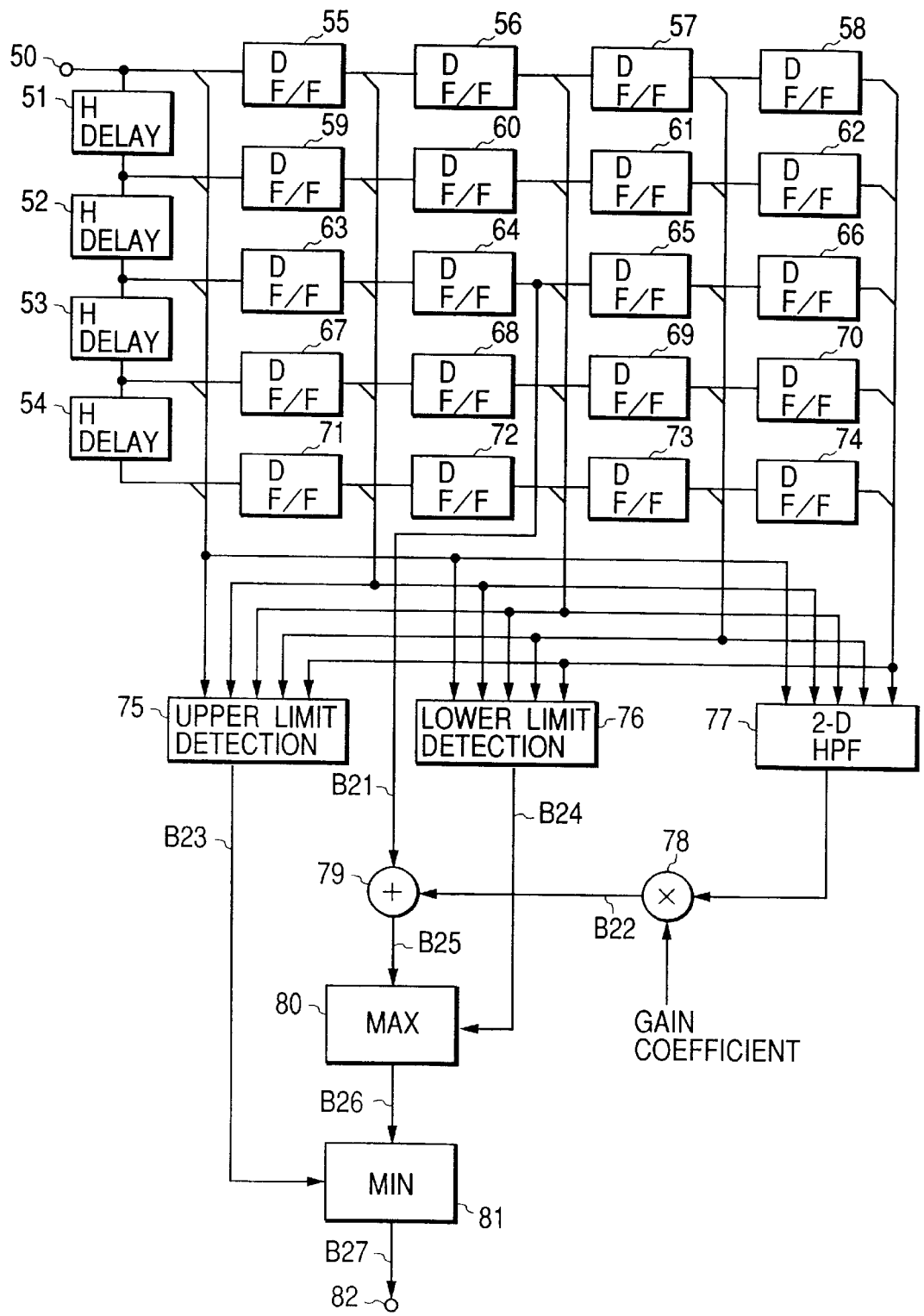
FIG. 6 is a block diagram of a contour correction apparatus according to a third embodiment of this invention.

FIG. 6 shows a contour correction apparatus according to a third embodiment of this invention. The contour correction apparatus of FIG. 6 includes an apparatus input terminal 50 subjected to an input digital video signal which is the digital version of one of a red signal, a green signal, a blue signal, a luminance signal, and color-difference signals. The contour correction apparatus of FIG. 6 also includes an apparatus output terminal 82.

The contour correction apparatus of FIG. 3 further includes delay elements 51–54, D flip-flops 55–74, an upper limit detection circuit 75, a lower limit detection circuit 76, a two-dimensional high pass filter 77, a multiplier 78, an adder 79, a maximum value detection circuit 80, and a minimum value detection circuit 81.

Each of the delay elements 51–54 provides a signal delay corresponding to one horizontal scanning interval (a 1-H interval). The delay elements 51–54 are connected in series or cascade. The input terminal of the delay element 51 is connected to the apparatus input terminal 50. The output terminal of the delay element 51 is connected to the input terminal of the delay element 52. The output terminal of the delay element 52 is connected to the input terminal of the delay element 53. The output terminal of the delay element 53 is connected to the input terminal of the delay element 54.

The D flip-flops 55–58 serve as 1-sample delay elements, respectively. The D flip-flops 55–58 are connected in series or cascade. The input terminal of the D flip-flop 55 is connected to the apparatus input terminal 50. The output terminal of the D flip-flop 55 is connected to the input terminal of the D flip-flop 56. The output terminal of the D flip-flop 56 is connected to the input terminal of the D flip-flop 57. The output terminal of the D flip-flop 57 is connected to the input terminal of the D flip-flop 58.

The D flip-flops 59–62 serve as 1-sample delay elements, respectively. The D flip-flops 59–62 are connected in series or cascade. The input terminal of the D flip-flop 59 is connected to the output terminal of the delay element 51. The output terminal of the D flip-flop 59 is connected to the input terminal of the D flip-flop 60. The output terminal of the D flip-flop 60 is connected to the input terminal of the D flip-flop 61. The output terminal of the D flip-flop 61 is connected to the input terminal of the D flip-flop 62.

The D flip-flops 63–66 serve as 1-sample delay elements, respectively. The D flip-flops 63–66 are connected in series or cascade. The input terminal of the D flip-flop 63 is connected to the output terminal of the delay element 52. The output terminal of the D flip-flop 63 is connected to the input terminal of the D flip-flop 64. The output terminal of the D flip-flop 64 is connected to the input terminal of the D flip-flop 65. The output terminal of the D flip-flop 65 is connected to the input terminal of the D flip-flop 66.

The D flip-flops 67–70 serve as 1-sample delay elements, respectively. The D flip-flops 67–70 are connected in series or cascade. The input terminal of the D flip-flop 67 is connected to the output terminal of the delay element 53.

The output terminal of the D flip-flop 67 is connected to the input terminal of the D flip-flop 68. The output terminal of the D flip-flop 68 is connected to the input terminal of the D flip-flop 69. The output terminal of the D flip-flop 69 is connected to the input terminal of the D flip-flop 70.

The D flip-flops 71–74 serve as 1-sample delay elements, respectively. The D flip-flops 71–74 are connected in series or cascade. The input terminal of the D flip-flop 71 is connected to the output terminal of the delay element 54. The output terminal of the D flip-flop 71 is connected to the input terminal of the D flip-flop 72. The output terminal of the D flip-flop 72 is connected to the input terminal of the D flip-flop 73. The output terminal of the D flip-flop 73 is connected to the input terminal of the D flip-flop 74.

The upper limit detection circuit 75 is connected to the apparatus input terminal 50. The upper limit detection circuit 75 is also connected to the output terminals of the delay elements 51–54 and the D flip-flops 55–74. The upper limit detection circuit 75 is connected to the minimum value detection circuit 81.

The lower limit detection circuit 76 is connected to the apparatus input terminal 50. The lower limit detection circuit 76 is also connected to the output terminals of the delay elements 51–54 and the D flip-flops 55–74. The lower limit detection circuit 76 is connected to the maximum value detection circuit 80.

The two-dimensional high pass filter 77 is connected to the apparatus input terminal 50. The two-dimensional high pass filter 77 is also connected to the output terminals of the delay elements 51–54 and the D flip-flops 55–74. The two-dimensional high pass filter 77 is connected to a first input terminal of the multiplier 78. A second input terminal of the multiplier 78 is subjected to a control signal representing a variable gain coefficient.

The output terminal of the multiplier 78 is connected to a first input terminal of the adder 79. A second input terminal of the adder 79 is connected to the output terminal of the D flip-flop 64. The output terminal of the adder 79 is connected to the maximum value detection circuit 80. The maximum value detection circuit 80 is connected to the minimum value detection circuit 81. The minimum value detection circuit 81 is connected to the apparatus output terminal 82.

The D flip-flops 55–74 receive a clock pulse signal from a suitable device (not shown). The clock pulse signal has a given frequency and a given period corresponding to one signal sample. Each of the D flip-flops 55–74 provides a signal delay in response to the clock pulse signal. The provided signal delay corresponds to the period of the clock pulse signal. Thus, the provided signal delay corresponds to one signal sample.

The input digital video signal applied to the apparatus input terminal 50 has a stream of digital signal samples temporally spaced at equal intervals corresponding to the period of the clock pulse signal. The samples of the input digital video signal correspond to pixels, respectively. The input digital video signal is fed via the apparatus input terminal 50 to the delay element 51, the D flip-flop 55, the upper limit detection circuit 75, the lower limit detection circuit 76, and the two-dimensional high pass filter 77.

The input digital video signal passes through the delay elements 51–54 while being deferred thereby. As previously indicated, each of the delay elements 51–54 provides a signal delay corresponding to one horizontal scanning interval (a 1-H interval). The input digital video signal passes through the D flip-flops 55–58 while being deferred thereby. Each of the D flip-flops 55–58 provides a signal delay corresponding to the period of the clock pulse signal, that is, the 1-sample interval.

The output signal of the delay element 51 passes through the D flip-flops 59–62 while being deferred thereby. Each of the D flip-flops 59–62 provides a signal delay corresponding to the period of the clock pulse signal, that is, the 1-sample interval. The output signal of the delay element 52 passes through the D flip-flops 63–66 while being deferred thereby. Each of the D flip-flops 63–66 provides a signal delay corresponding to the period of the clock pulse signal, that is, the 1-sample interval. The output signal of the delay element 53 passes through the D flip-flops 67–70 while being deferred thereby. Each of the D flip-flops 67–70 provides a signal delay corresponding to the period of the clock pulse signal, that is, the 1-sample interval. The output signal of the delay element 54 passes through the D flip-flops 71–74 while being deferred thereby. Each of the D flip-flops 71–74 provides a signal delay corresponding to the period of the clock pulse signal, that is, the 1-sample interval.

The input digital video signal and the output signals of the delay elements 51–54 and the D flip-flops 55–74 correspond to 5 by 5 neighboring pixels (5 successive pixels in the horizontal direction by 5 neighboring pixels in the vertical direction). The output signal B21 of the D flip-flop 64 is defined as corresponding to a pixel of interest which agrees with a center pixel among the 5 by 5 neighboring pixels.

The upper limit detection circuit 75 receives the input digital video signal and also the output signals of the delay elements 51–54 and the D flip-flops 55–74 (the twenty-five signals). The upper limit detection circuit 75 compares the values (the levels) represented by the twenty-five signals, and serially numbers the twenty-five signals in the order of their value magnitude. The upper limit detection circuit 75 selects one signal from among the twenty-five signals which has a predetermined serial number chosen so that the value of the selected signal will be smaller than the greatest value and greater than the central value. For example, the value of the selected signal is equal to the fourth greatest value. It should be noted that the value of the selected signal may be equal to the second greatest value, the third greatest value, or the fifth greatest value. The value of the signal selected by the upper limit detection circuit 75 will be used as an upper limit value by the minimum value detection circuit 81. The upper-limit signal B23 selected by the upper limit detection circuit 75 is fed to the minimum value detection circuit 81.

The upper limit detection circuit 75 may divide the twenty-five signals into a first group corresponding to small values, a second group corresponding to intermediate values, and a third group corresponding to large values. In this case, the upper limit detection circuit 75 selects one signal from the third group which has the value smaller than the greatest value.

The lower limit detection circuit 76 receives the input digital video signal and also the output signals of the delay elements 51–54 and the D flip-flops 55–74 (the twenty-five signals). The lower limit detection circuit 76 compares the values (the levels) represented by the twenty-five signals, and serially numbers the twenty-five signals in the order of their value magnitude. The lower limit detection circuit 76 selects one signal from among the twenty-five signals which has a predetermined serial number chosen so that the value of the selected signal will be greater than the smallest value and smaller than the central value. For example, the value of the selected signal is equal to the fourth smallest value. It should be noted that the value of the selected signal may be equal to the second smallest value, the third smallest value, or the fifth smallest value. The value of the signal selected by the lower limit detection circuit 76 will be used as a lower limit value by the maximum value detection circuit 80. The lower-limit signal B24 selected by the lower limit detection circuit 76 is fed to the maximum value detection circuit 80.

The lower limit detection circuit 76 may divide the twenty-five signals into a first group corresponding to small values, a second group corresponding to intermediate values, and a third group corresponding to large values. In this case, the lower limit detection circuit 76 selects one signal from the first group which has the value greater than the smallest value.

The two-dimensional high pass filter 77 receives the input digital video signal and also the output signals of the delay elements 51–54 and the D flip-flops 55–74 (the twenty-five signals). The two-dimensional high pass filter 77 processes the twenty-five signals into a signal corresponding to high-frequency components of the output signal B21 of the D flip-flop 64. For example, the two-dimensional high pass filter 77 includes a 25-tap filter having tap gains given and arranged as follows.

| -1/256 | -4/256 | -6/256 | -4/256 | -1/256 |
|---|---|---|---|---|
| -4/256 | -16/256 | -24/256 | -16/256 | -4/256 |
| -6/256 | -24/256 | 220/256 | -24/256 | -6/256 |
| -4/256 | -16/256 | -24/256 | -16/256 | -4/256 |
| -1/256 | -4/256 | -6/256 | -4/256 | -1/256 |

The tap gains are assigned to the twenty-five signals respectively. The arrangement of the tap gains is symmetrical with respect to the center. The two-dimensional high pass filter 77 outputs the high-frequency-corresponding signal to the multiplier 78.

The device 78 multiplies the value of the output signal of the two-dimensional high pass filter 77 by the gain coefficient represented by the control signal. Thus, the multiplier 78 converts the output signal of the two-dimensional high pass filter 77 into a multiplication-resultant signal B22. The multiplier 78 outputs the multiplication-resultant signal B22 to the adder 79. The adder 79 combines the output signal B21 of the D flip-flop 64 and the output signal B22 of the multiplier 78 into an addition-resultant signal B25. The operation of the adder 79 agrees with a process of adding the high-frequency components to the output signal B21 of the D flip-flop 64 to sharpen contours or edges in a picture represented by the input digital video signal. Here, the contours and the edges in the picture mean the boundaries among different-hue or different-luminance zones in the picture. The adder 79 outputs the addition-resultant signal B25 to the maximum value detection circuit 80.

The maximum value detection circuit 80 compares the values (the levels) represented by the output signals B24 and B25 of the lower limit detection circuit 76 and the adder 79, and detects and selects one signal from among them which has the greater value (the maximum value). The greater-value signal B26 selected by the maximum value detection circuit 80 is fed to the minimum value detection circuit 81. The greater-value signal B16 represents a waveform from which undershoot portions are removed.

The minimum value detection circuit 81 compares the values (the levels) represented by the output signals B23 and B26 of the upper limit detection circuit 75 and the maximum value detection circuit 80, and detects and selects one signal from among them which has the smaller value (the minimum value). The smaller-value signal B27 selected by the minimum value detection circuit 81 is applied to the apparatus output terminal 82. The smaller-value signal B27 represents a waveform from which overshoot portions are removed. The smaller-value signal B27 is fed via the apparatus output terminal 82 to an external device (not shown) as a correction-resultant video signal.

The maximum value detection circuit 80 and the minimum value detection circuit 81 serve as a device for limiting the value of the signal B25 to within the range between the maximum value (the upper limit value) and the minimum value (the lower limit value). The contour correction apparatus of FIG. 6 sharpens every contour in a picture represented by the input digital video signal to a degree depending on the gain coefficient given by the control signal fed to the multiplier 78. The degree of the sharpening can be adjusted by changing the gain coefficient. The contour correction apparatus of FIG. 6 can remove noise components from the input digital video signal.

It should be noted that the upper limit detection circuit 75 and the lower limit detection circuit 76 may be modified to operate on 5 by 3 neighboring pixels (5 successive pixels in the horizontal direction by 3 neighboring pixels in the vertical direction).

The upper limit detection circuit 75 and the lower limit detection circuit 76 may be replaced by a maximum value detection circuit and a minimum value detection circuit respectively.

The upper limit detection circuit 75 and the lower limit detection circuit 76 may be modified to operate on only at least five neighboring pixels in the vertical direction or the horizontal direction whose center is the pixel of interest.

Fourth Embodiment

Figure 7:
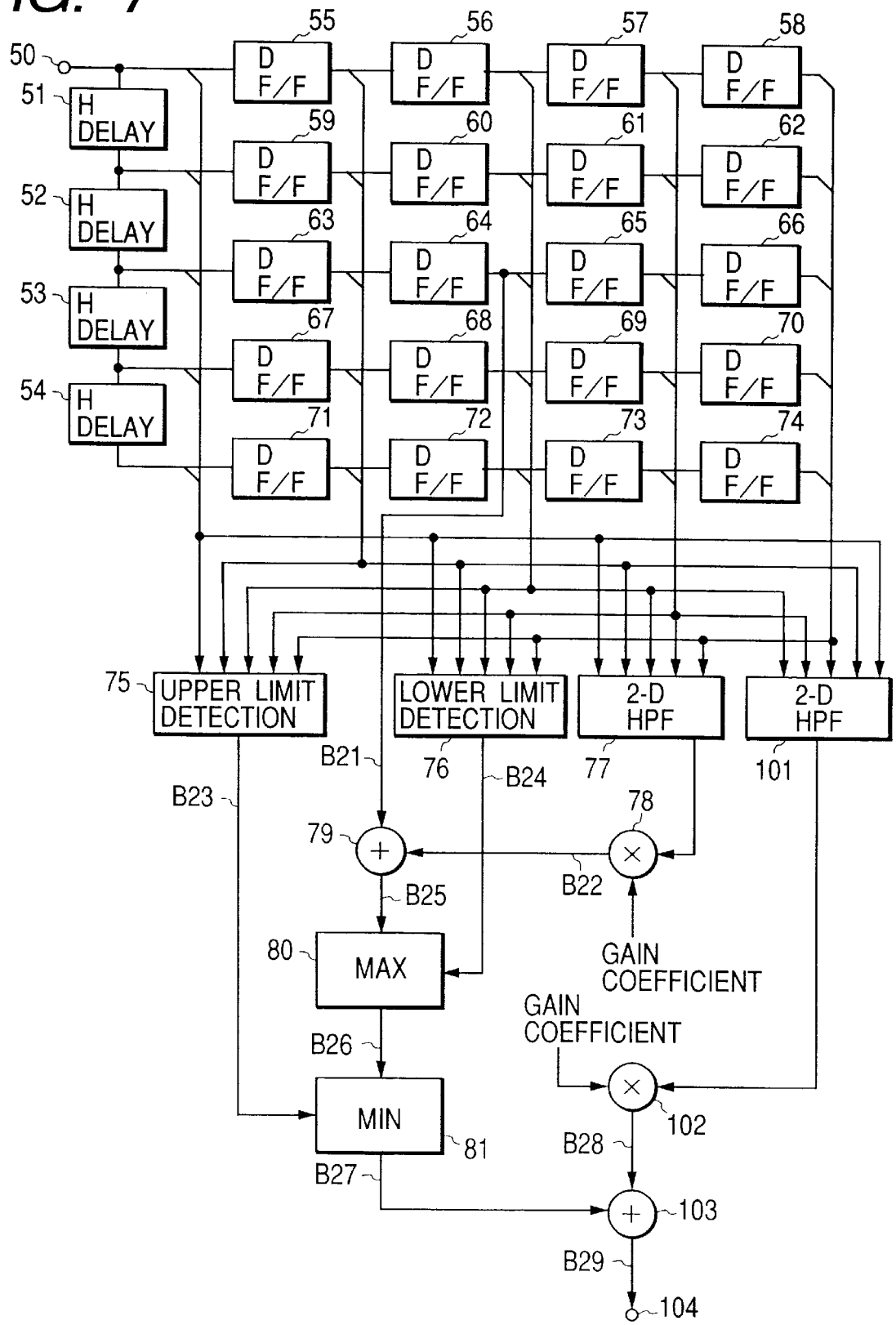
FIG. 7 is a block diagram of a contour correction apparatus according to a fourth embodiment of this invention.

FIG. 7 shows a contour correction apparatus according to a fourth embodiment of this invention. The contour correction apparatus of FIG. 7 is similar to the contour correction apparatus of FIG. 6 except for an additional design explained below.

The contour correction apparatus of FIG. 7 includes a two-dimensional high pass filter 101, a multiplier 102, an adder 103, and an apparatus output terminal 104.

The two-dimensional high pass filter 101 is connected to the apparatus input terminal 50. The two-dimensional high pass filter 101 is also connected to the output terminals of the delay elements 51–54 and the D flip-flops 55–74. Furthermore, the two-dimensional high pass filter 101 is connected to a first input terminal of the multiplier 102. A second input terminal of the multiplier 102 is subjected to a control signal representing a variable gain coefficient.

The output terminal of the multiplier 102 is connected to a first input terminal of the adder 103. A second input terminal of the adder 103 is connected to the output terminal of the minimum value detection circuit 81. The output terminal of the adder 103 is connected to the apparatus output terminal 104.

The two-dimensional high pass filter 101 receives the input digital video signal and also the output signals of the delay elements 51–54 and the D flip-flops 55–74 (the twenty-five signals). The two-dimensional high pass filter 101 processes the twenty-five signals into a signal corresponding to high-frequency components of the output signal B21 of the D flip-flop 64. For example, the two-dimensional high pass filter 101 includes a 25-tap filter having tap gains chosen according to the spatial high-frequency response characteristics of a display. The tap gains are assigned to the twenty-five signals respectively. The two-dimensional high pass filter 101 outputs the high-frequency-corresponding signal to the multiplier 102.

The device 102 multiplies the value of the output signal of the two-dimensional high pass filter 101 by the gain coefficient represented by the control signal. Thus, the multiplier 102 converts the output signal of the two-dimensional high pass filter 101 into a multiplication-resultant signal B28. The multiplier 102 outputs the multiplication-resultant signal B28 to the adder 103. The adder 103 receives the output signal B27 of the minimum value detection circuit 81. The adder 103 combines the output signal B27 of the minimum value detection circuit 81 and the output signal B28 of the multiplier 102 into an addition-resultant signal B29. The operation of the adder 103 agrees with a process of adding the high-frequency components, that is, the shoot components, to the output signal B27 of the minimum value detection circuit 81 to further sharpen contours or edges in a picture represented by the input digital video signal. The addition-resultant signal B29 is applied from the adder 103 to the apparatus output terminal 104. The addition-resultant signal B29 is fed via the apparatus output terminal 104 to an external device (not shown) as a correction-resultant video signal.

The contour correction apparatus of FIG. 7 is suited for use with a projection display which tends to indicate spatial high-frequency components of a picture at a reduced level.

Figure 8:
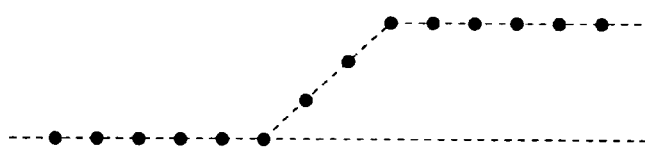
FIG. 8 is a time-domain diagram of the values represented by samples of various signals in the contour correction apparatus of FIG. 7.
Figure 8:
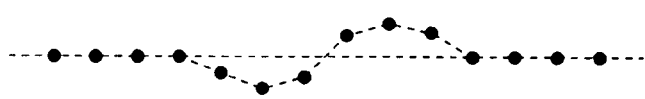
Figure 8:
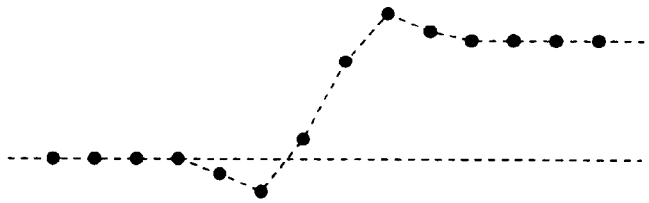

Variations in the values represented by the signals B27, B28, and B29 will be explained with reference to FIG. 8. It is assumed that the value represented by a sample of the output signal B27 of the minimum value detection circuit 81 increases at a constant rate during a 3-sample time interval as shown in FIG. 8. The increase in the value of the signal B27 corresponds to a contour or an edge in a picture. The value represented by the output signal B28 of the multiplier 102 varies along a time-domain form corresponding to a differential of the time-domain form of the value represented by the signal B21. The time-domain form of the value of the signal B28 is substantially equivalent to a differential of the time-domain form of the value of the signal B27 as shown in FIG. 8.

The value represented by the output signal B29 of the adder 103 varies along a time-domain form corresponding to the combination of the time-domain form of the value represented by the signal B27 and the time-domain form of the value represented by the signal B28. The time-domain form of the value of the signal B29 has a small undershoot portion and a small overshoot portion immediately preceding and following an increasing portion respectively. The value of the signal B29 increases at a rate higher than the rate of the increase in the value of the signal B27. The higher increasing rate means further sharpening the contour or the edge in the picture. The rate of the increase in the value of the signal B29 depends on the gain coefficient represented by the control signal fed to the multiplier 102. Specifically, the rate of the increase in the value of the signal B29 rises as the gain coefficient increases.

Fifth Embodiment

Figure 9:
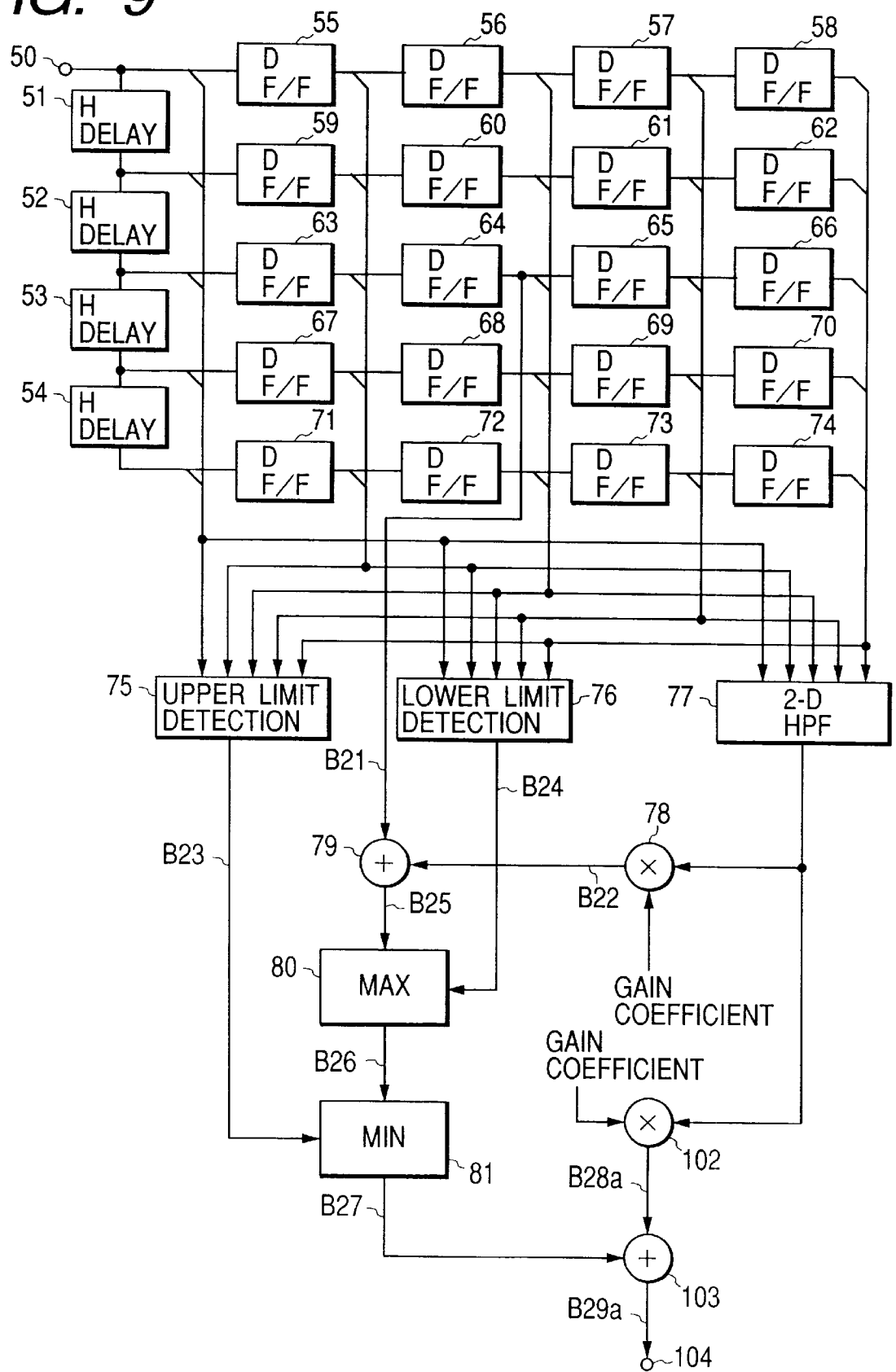
FIG. 9 is a block diagram of a contour correction apparatus according to a fifth embodiment of this invention.

FIG. 9 shows a contour correction apparatus according to a fifth embodiment of this invention. The contour correction apparatus of FIG. 9 is similar to the contour correction apparatus of FIG. 7 except for a design change explained below.

The contour correction apparatus of FIG. 9 includes a multiplier 102, an adder 103, and an apparatus output terminal 104.

A first input terminal of the multiplier 102 is connected to the two-dimensional high pass filter 77. A second input terminal of the multiplier 102 is subjected to a control signal representing a variable gain coefficient.

The output terminal of the multiplier 102 is connected to a first input terminal of the adder 103. A second input terminal of the adder 103 is connected to the output terminal of the minimum value detection circuit 81. The output terminal of the adder 103 is connected to the apparatus output terminal 104.

The device 102 multiplies the value of the output signal of the two-dimensional high pass filter 77 by the gain coefficient represented by the control signal. Thus, the multiplier 102 converts the output signal of the two-dimensional high pass filter 101 into a multiplication-resultant signal B28a. The multiplier 102 outputs the multiplication-resultant signal B28a to the adder 103. The adder 103 receives the output signal B27 of the minimum value detection circuit 81. The adder 103 combines the output signal B27 of the minimum value detection circuit 81 and the output signal B28a of the multiplier 102 into an addition-resultant signal B29a. The operation of the adder 103 agrees with a process of adding the high-frequency components, that is, the shoot components, to the output signal B27 of the minimum value detection circuit 81 to further sharpen contours or edges in a picture represented by the input digital video signal. The addition-resultant signal B29a is applied from the adder 103 to the apparatus output terminal 104. The addition-resultant signal B29a is fed via the apparatus output terminal 104 to an external device (not shown) as a correction-resultant video signal.

Sixth Embodiment

Figure 10:
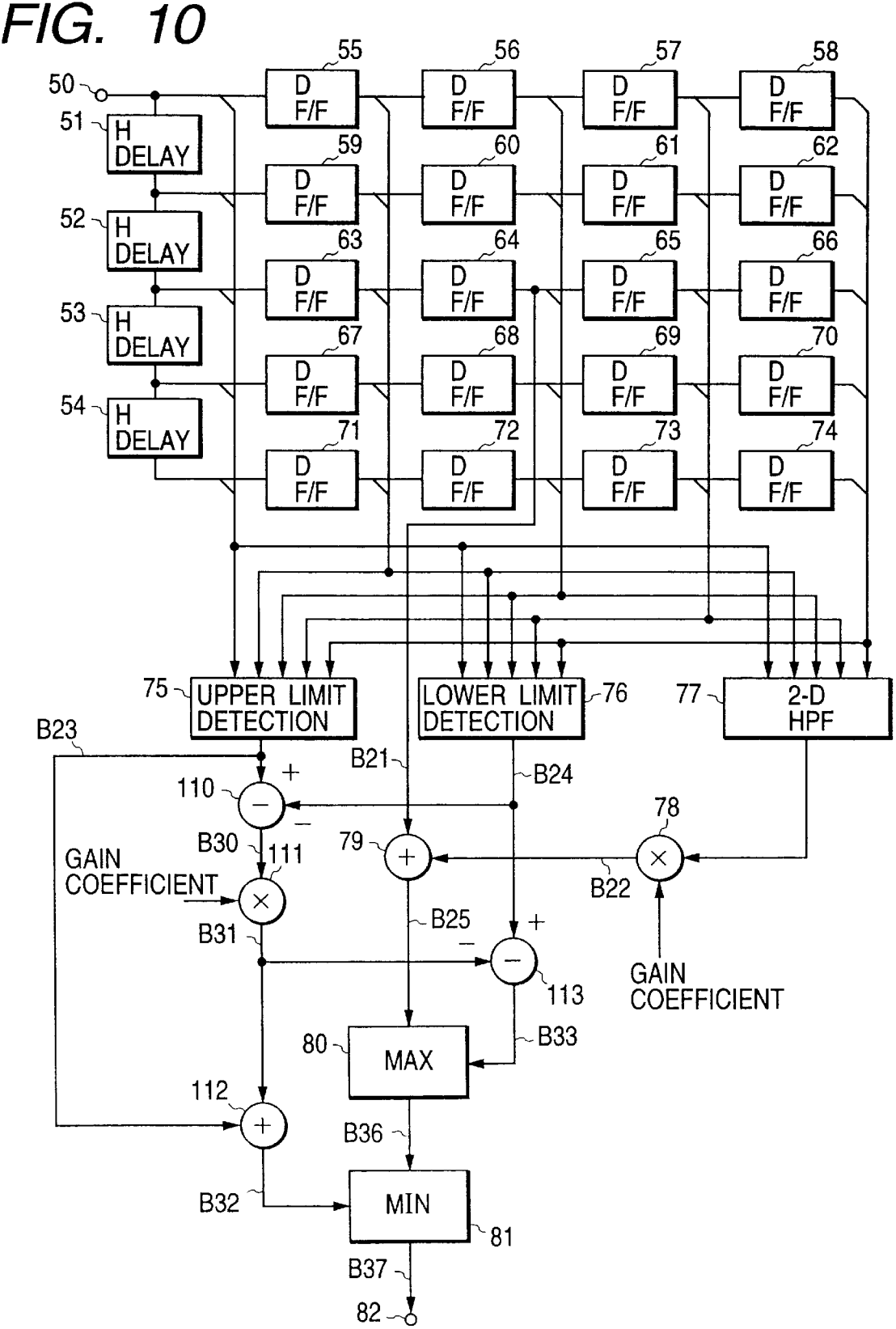
FIG. 10 is a block diagram of a contour correction apparatus according to a sixth embodiment of this invention.

FIG. 10 shows a contour correction apparatus according to a sixth embodiment of this invention. The contour correction apparatus of FIG. 10 is similar to the contour correction apparatus of FIG. 9 except for a design change explained below.

The contour correction apparatus of FIG. 10 includes a subtracter 110, a multiplier 111, an adder 112, a subtracter 113, and an apparatus output terminal 82. A first input terminal of the subtracter 110 is connected to the upper limit detection circuit 75. A second input terminal of the subtracter 110 is connected to the lower limit detection circuit 76. The output terminal of the subtracter 110 is connected to a first input terminal of the multiplier 111. A second input terminal of the multiplier 111 is subjected to a control signal representing a variable gain coefficient.

A first input terminal of the adder 112 is connected to the output terminal of the multiplier 111. A second input terminal of the adder 112 is connected to the upper limit detection circuit 75. The output terminal of the adder 112 is connected to the minimum value detection circuit 81. A first input terminal of the subtracter 113 is connected to the lower limit detection circuit 76. A second input terminal of the subtracter 113 is connected to the output signal of the multiplier 111. The output terminal of the subtracter 113 is connected to the maximum value detection circuit 80. The minimum value detection circuit 81 is connected to the apparatus output terminal 82.

The subtracter 110 receives the output signals B23 and B24 of the upper limit detection circuit 75 and the lower limit detection circuit 76. The device 110 subtracts the signal B24 from the signal B23. The subtracter 110 outputs the subtraction-resultant signal B30 to the multiplier 111.

The device 111 multiplies the value of the output signal B30 of the subtracter 110 by the gain coefficient represented by the control signal. Thus, the multiplier 111 converts the output signal B30 of the subtracter 110 into a multiplication-resultant signal B31. The multiplier 111 outputs the multiplication-resultant signal B31 to the adder 112 and the subtracter 113. The adder 112 receives the output signal B23 of the upper limit detection circuit 75. The adder 112 combines the output signal B23 of the lower limit detection circuit 75 and the output signal B31 of the multiplier 111 into an addition-resultant signal B32. The operation of the adder 112 agrees with a process of increasing an overshoot clip level above the upper limit value. The adder 112 outputs the addition-resultant signal B32 to the minimum value detection circuit 81.

The subtracter 113 receives the output signals B24 and B31 of the lower limit detection circuit 76 and the multiplier 111. The device 113 subtracts the signal B31 from the signal B24. The operation of the subtracter 113 agrees with a process of decreasing an undershoot clip level below the lower limit value. The subtracter 113 outputs the subtraction-resultant signal B33 to the maximum value detection circuit 80.

The maximum value detection circuit 80 compares the values (the levels) represented by the output signals B25 and B33 of the adder 79 and the subtracter 113, and detects and selects one signal from among them which has the greater value (the maximum value). The greater-value signal B36 selected by the maximum value detection circuit 80 is fed to the minimum value detection circuit 81. The greater-value signal B36 represents a waveform to which small undershoot portions are added.

The minimum value detection circuit 81 compares the values (the levels) represented by the output signals B32 and B36 of the adder 112 and the maximum value detection circuit 80, and detects and selects one signal from among them which has the smaller value (the minimum value). The smaller-value signal B37 selected by the minimum value detection circuit 81 is applied to the apparatus output terminal 82. The smaller-value signal B37 represents a waveform to which small overshoot portions and small undershoot portions are added. The added undershoot and overshoot portions further sharpen contours or edges in a picture. The magnitudes of the added undershoot and overshoot portions depend on the gain coefficient represented by the control signal fed to the multiplier 111. The smaller-value signal B37 is fed via the apparatus output terminal 82 to an external device (not shown) as a correction-resultant video signal.

Seventh Embodiment

Figure 11:
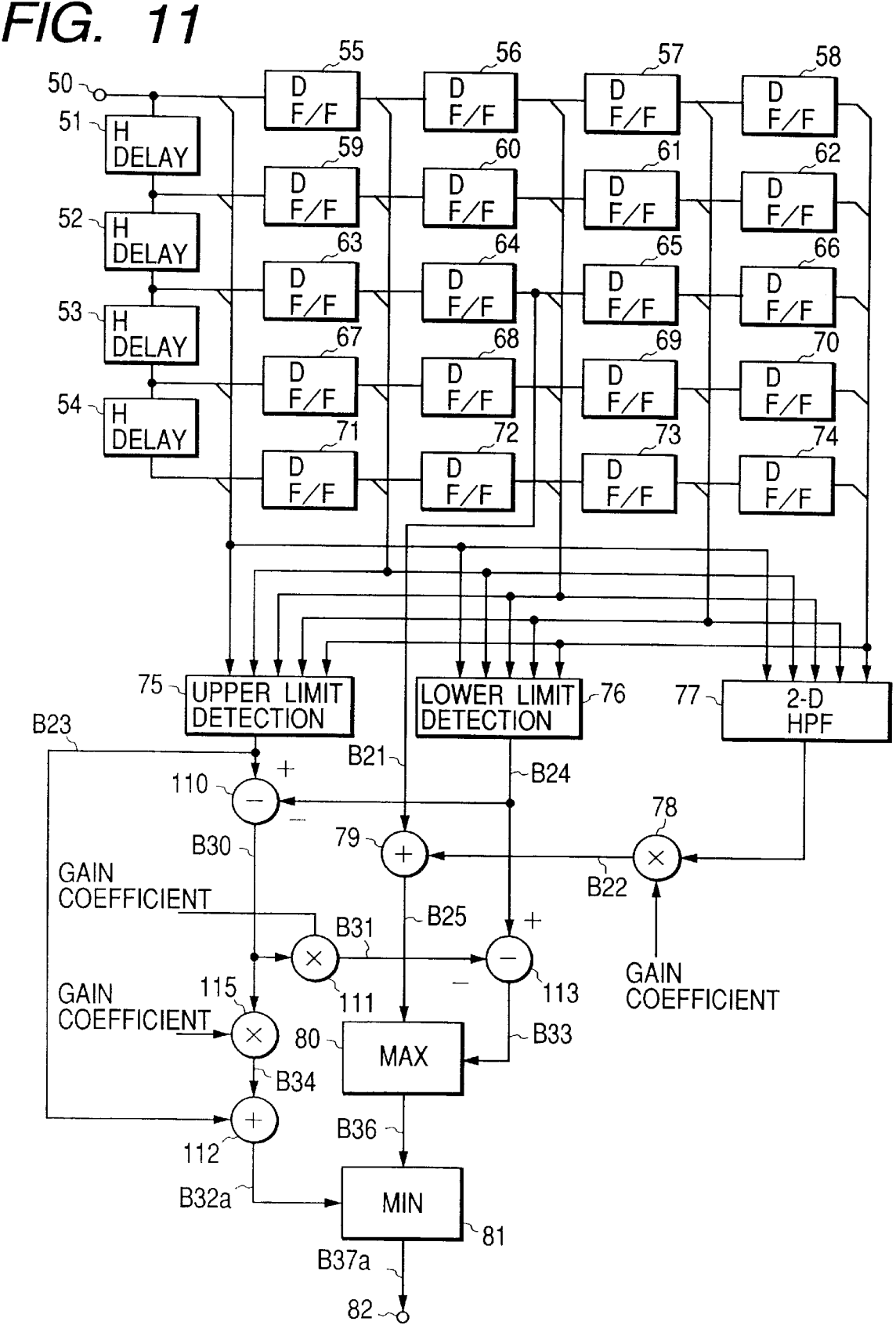
FIG. 11 is a block diagram of a contour correction apparatus according to a seventh embodiment of this invention.

FIG. 11 shows a contour correction apparatus according to a seventh embodiment of this invention. The contour correction apparatus of FIG. 11 is similar to the contour correction apparatus of FIG. 10 except for an additional design explained below.

The contour correction apparatus of FIG. 11 includes a multiplier 115. A first input terminal of the multiplier 115 is connected to the output terminal of the subtracter 110. A second input terminal of the multiplier 115 is subjected to a control signal representing a variable gain coefficient. The output terminal of the multiplier 115 is connected to a first input terminal of the adder 112. A second input terminal of the adder 112 is connected to the upper limit detection circuit 75.

The multiplier 115 receives the output signal B30 of the subtracter 110. The device 115 multiplies the value of the signal B30 by the gain coefficient represented by the control signal fed thereto. Thus, the multiplier 115 converts the output signal B30 of the subtracter 110 into a multiplication-resultant signal B34. The multiplier 115 outputs the multiplication-resultant signal B34 to the adder 112. The adder 112 receives the output signal B23 of the upper limit detection circuit 75. The adder 112 combines the output signal B23 of the lower limit detection circuit 75 and the output signal B34 of the multiplier 115 into an addition-resultant signal B32a. The adder 112 outputs the addition-resultant signal B32a to the minimum value detection circuit 81.

The minimum value detection circuit 81 compares the values (the levels) represented by the output signals B32a and B36 of the adder 112 and the maximum value detection circuit 80, and detects and selects one signal from among them which has the smaller value (the minimum value). The smaller-value signal B37a selected by the minimum value detection circuit 81 is applied to the apparatus output terminal 82. The smaller-value signal B37a represents a waveform to which small overshoot portions and small undershoot portions are added. The added undershoot and overshoot portions further sharpen contours or edges in a picture. The magnitudes of the added overshoot portions depend on the gain coefficient represented by the control signal fed to the multiplier 115. The magnitudes of the added undershoot portions depend on the gain coefficient represented by the control signal fed to the multiplier 111. The smaller-value signal B37a is fed via the apparatus output terminal 82 to an external device (not shown) as a correction-resultant video signal.

Preferably, the gain coefficient represented by the control signal fed to the multiplier 111 is different from the gain coefficient represented by the control signal fed to the multiplier 115. For example, the gain coefficient represented by the control signal fed to the multiplier 111 is greater than the gain coefficient represented by the control signal fed to the multiplier 115. In this case, an undershoot portion and an overshoot portion of the output signal B37a of the minimum value detection circuit 81 are asymmetrical with each other. Preferably, this asymmetry is designed according to the gamma characteristics or the input-output nonlinear characteristics of a display.

Eighth Embodiment

An eighth embodiment of this invention is similar to the embodiment of FIG. 7 except for the following design change. The eighth embodiment of this invention includes a polarity detector for sensing the polarity of the output signal of the two-dimensional high pass filter 101 (see FIG. 7). Also, the eighth embodiment of this invention includes a switch for changing the gain coefficient, which is represented by the control signal fed to the multiplier 102 (see FIG. 7), in response to the polarity sensed by the polarity detector. Thus, the gain coefficient used for a positive-polarity signal portion is different from the gain coefficient used for a negative-polarity signal portion. Accordingly, the magnitude of a positive-polarity shoot portion and the magnitude of a negative-polarity shoot portion are different from each other. Preferably, this difference is designed according to the gamma characteristics or the input-output nonlinear characteristics of a display.

Variations in the values represented by the signals B27, B28, and B29 will be explained with reference to FIG. 12. It is assumed that the value represented by a sample of the output signal B27 of the minimum value detection circuit 81 (see FIG. 7) increases at a constant rate during a 3-sample time interval as shown in FIG. 12. The increase in the value of the signal B27 corresponds to a contour or an edge in a picture. The value represented by the output signal B28 of the multiplier 102 (see FIG. 7) varies along a time-domain form having an undershoot-corresponding portion and an overshoot-corresponding portion which are asymmetrical with each other as shown in FIG. 12.

The value represented by the output signal B29 of the adder 103 (see FIG. 12) varies along a time-domain form corresponding to the combination of the time-domain form of the value represented by the signal B27 and the time-domain form of the value represented by the signal B28. The time-domain form of the value of the signal B29 has a small undershoot portion and a small overshoot portion which are asymmetrical with each other.

Ninth Embodiment

A ninth embodiment of this invention is similar to the embodiment of FIG. 7 except for the following design change. The ninth embodiment of this invention includes a nonlinear processing circuit provided between the multiplier 102 and the adder 103. The nonlinear processing circuit provides the output signal of the multiplier 102 with a nonlinearity which enables the magnitude of a positive-polarity shoot portion and the magnitude of a negative-polarity shoot portion to be different from each other. Preferably, this difference is designed according to the gamma characteristics or the input-output nonlinear characteristics of a display.

What is claimed is:

1. A contour correction apparatus comprising:
   first means for selecting a first sample from among at least five plural samples of an input digital video signal as an indication of an upper limit value, the plural samples corresponding to neighboring pixels respectively, the first sample having a value greater than a center value among values of the plural samples;
   second means for selecting a second sample from among at least the five plural samples as an indication of a lower limit value, the second sample having a value smaller than the center value among the values of the plural samples;
   third means for generating high-frequency signal components with respect to a center sample among the plural samples;
   fourth means for adding the high-frequency signal components generated by the third means to the center sample among the plural samples to generate an addition-resultant signal; and
   fifth means for limiting a value of the addition-resultant signal generated by the fourth means to within a range between the upper limit value and the lower limit value provided by the first and second means.

2. A contour correction apparatus as recited in claim 1, wherein the value of the first sample is equal to a greatest value among the values of the plural samples, and the value of the second sample is equal to a smallest value among the values of the plural samples.

3. A contour correction apparatus as recited in claim 1, wherein the value of the first sample is different from a greatest value among the values of the plural samples, and the value of the second sample is different from a smallest value among the values of the plural samples.

4. A contour correction apparatus as recited in claim 1, further comprising sixth means for adding high-frequency signal components to an output signal of the fifth means to additionally generate undershoot-corresponding signal components and overshoot-corresponding signal components in the output signal of the fifth means.

5. A contour correction apparatus as recited in claim 1, further comprising sixth means for increasing the upper limit value above its normal level and decreasing the lower limit value below its normal level to additionally generate undershoot-corresponding signal components and overshoot-corresponding signal components in an output signal of the fifth means.

6. A contour correction apparatus as recited in claim 4, further comprising seventh means for making the undershoot-corresponding signal components and the overshoot-corresponding signal components asymmetrical with each other in time-domain amplitude form.

7. A contour correction apparatus as recited in claim 5, further comprising seventh means for making the undershoot-corresponding signal components and the overshoot-corresponding signal components asymmetrical with each other in time-domain amplitude form.

8. A method of contour correction, comprising the steps of:
   selecting a first sample from among at least five plural samples of an input digital video signal as an indication of an upper limit value, the plural samples corresponding to neighboring pixels respectively, the first sample having a value greater than a center value among values of the plural samples;
   selecting a second sample from among at least the five plural samples as an indication of a lower limit value, the second sample having a value smaller than the center value among the values of the plural samples;
   generating high-frequency signal components with respect to a center sample among the plural samples;
   adding the high-frequency signal components to the center sample among the plural samples to generate an addition-resultant signal; and
   limiting a value of the addition-resultant signal to within a range between the upper limit value and the lower limit value.

* * * * *